US008823717B2

(12) United States Patent
Rogers

(10) Patent No.: US 8,823,717 B2
(45) Date of Patent: Sep. 2, 2014

(54) SOFTWARE CONSTANTS FILE

(75) Inventor: Philip J. Rogers, Pepperell, MA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 89 days.

(21) Appl. No.: 13/324,437

(22) Filed: Dec. 13, 2011

(65) Prior Publication Data

US 2013/0147813 A1    Jun. 13, 2013

(51) Int. Cl.
*G06T 1/00* (2006.01)
*G06T 15/00* (2011.01)
*G06T 1/60* (2006.01)

(52) U.S. Cl.
USPC .......................... 345/502; 345/522; 345/530

(58) Field of Classification Search
None
See application file for complete search history.

(56) References Cited

U.S. PATENT DOCUMENTS 7,701,461 B2 * 4/2010 Fouladi et al. ............... 345/558
2011/0087864 A1 * 4/2011 Duluk et al. ................. 712/220

OTHER PUBLICATIONS

Mikhail Bautin et al., Graphic Engine Resource Management, Multimedia Computing and Networking 2008, edited by Reza Rejaie, Roger Zimmermann, Proc. of SPIE—IS&T Electronic Imaging, SPIE vol. 6818, 68180O.*
Claudio Taglienti, Thread-Safe Circular Queue, Jun. 1, 2004, C++ Users Journal.*
Chung-Wen Huang, et al., "Support of Paged Register Files for Improving Context Switching on Embedded Processors," *International Conference on Computational Science and Engineering*:352-357, IEEE, United States (2009).
"Microsoft DirectX 10: TheNext-Generation Graphics API," *Technical Brief*, nvidia, United States (2006).
Pinheiro, R. B., et al., "Introduction to Multithreaded Rendering and the Usage of Deferred Context in DirectX 11," *SBC—Proceedings of SBGames 2011* :1-5, Brazil (2011).
Tanglienti, C., "Thread-safe circular queue: tackling the bounded buffer problem," *C/C++ Users Journal* 22(6):42-45, R&D Publications, United States (2004).
Wei-Chun Ku, et al. "VisoMT: A Collaborative Multithreading Multicore Processor for Multimedia Applications with a Fast Data Switching Mechanism" *IEEE Transactions on Circuits and Systems for Video Technology* 19(11):1633-1645, IEEE, United States (2009).
International Search Report and Written Opinion for International Application No. PCT/US2012/069249, European Patent Office, Netherlands, mailed on Mar. 7, 2013.

* cited by examiner

*Primary Examiner* — Joni Richer
*Assistant Examiner* — Yi Wang
(74) *Attorney, Agent, or Firm* — Sterne, Kessler, Goldstein & Fox P.L.L.C.

(57) ABSTRACT

Methods and systems relating to providing constants are provided. In an embodiment, a method of providing constants in a processing device includes copying a constant of a first constant buffer to a second constant buffer, the first and second constant buffers being included in a ring of constant buffers and a size of the ring being one greater than a number of processes that the processing device can process concurrently, updating a value of the constant in the second buffer, and binding a command to be executed on the processing device to the second constant buffer.

17 Claims, 5 Drawing Sheets

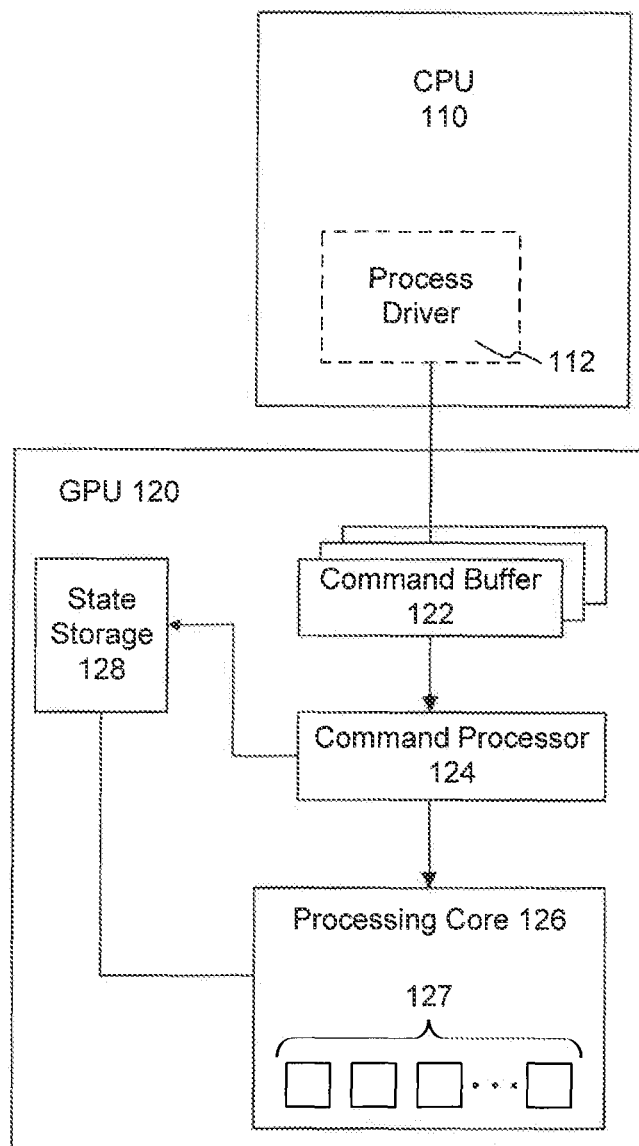
FIG. 1
Conventional

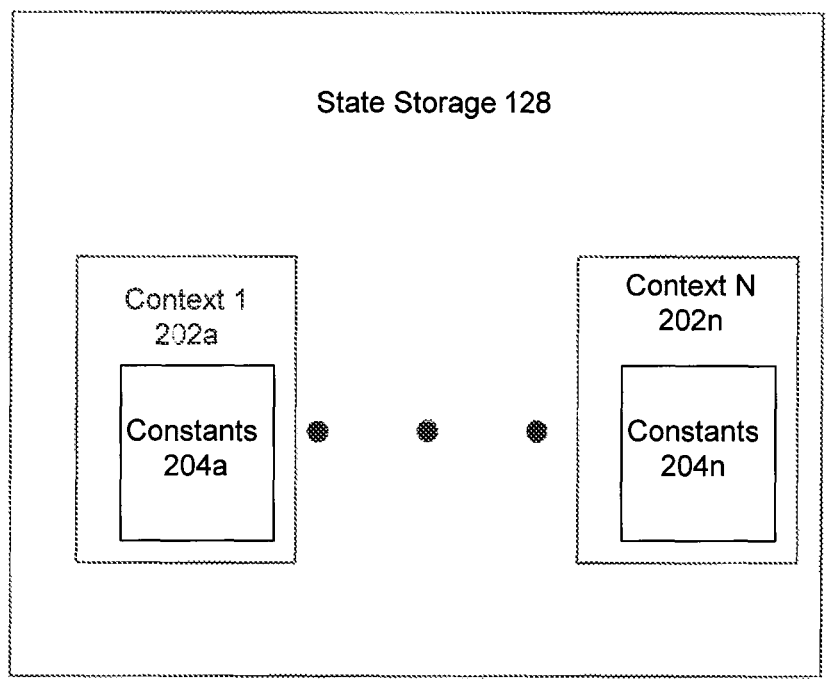
FIG. 2
Conventional

SOFTWARE CONSTANTS FILE

BACKGROUND

1. Field

The present invention relates to providing constants in processing systems.

2. Background Art

Many processing systems include a central processing unit (CPU) and a graphics processing unit (GPU). The CPU is a largely serial device that processes instructions sequentially, with subsequent instructions often relying on the results of previous instructions. The GPU, on the other hand, is a highly parallelized device, often including multiple execution units. Through its parallelized architecture, a GPU can be especially apt at executing graphics commands that often include the same operation executed on a multitude of different data sets (e.g., operations to change the state of pixels of a display).

Early GPUs included a hardware storage that stored a single set of state associated with commands being executed by the GPU. This state information can include, for example, constants that the command will access during execution. Thus, every time a command associated with different state information had to be executed, the launching of that command would have to wait tor the previous command to finish executing so that the state information could be safely overwritten without affecting the command currently in flight.

To overcome the limitations of these early GPUs, GPUs were developed that include hardware storage able to store a number of different sets of state information (e.g., GPUs that implemented DirectX 9). For example, some GPUs have hardware storage able to store eight sets of state information. Each of these sets of information included a number of constants that the command will access during execution. This hardware storage, however, can be expensive in terms of board or die space. Thus, many newer devices have eliminated hardware-based constants storage (e.g., GPUs that implement DirectX 10). Newer programs, associated with these newer devices, have been written to allocate portions of memory the execution engine can access when constants are needed. Older programs configured to access stored hardware-based constants, however, cannot be executed on these newer devices.

BRIEF SUMMARY OF EMBODIMENTS

Methods and systems relating to providing constants are provided. In an embodiment, a method of providing constants in a processing device includes copying a constant of a first constant buffer to a second constant buffer, the first and second constant buffers being included in a ring of constant buffers and a size of the ring being one greater than a number of processes that the processing device can process concurrently, updating a value of the constant in the second buffer, and binding a command to be executed on the processing device to the second constant buffer.

In another embodiment, a processing system includes a command processor configured to process commands for N processes simultaneously and a memory configured to store N+1 constant buffers. The command processor is configured to copy a constant of a first constant buffer of the N+1 buffers to a second constant buffer of the N+1 constant buffers, update a value of the constant in the second buffer, and bind a received command to the second constant buffer.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention. Various embodiments of the present invention are described below with reference to the drawings, wherein like reference numerals are used to refer to like elements throughout.

FIG. 1 is an illustrative block diagram of a conventional processing system.

FIG. 2 is an illustrative block diagram of a conventional state storage.

DETAILED DESCRIPTION

Figure 3:
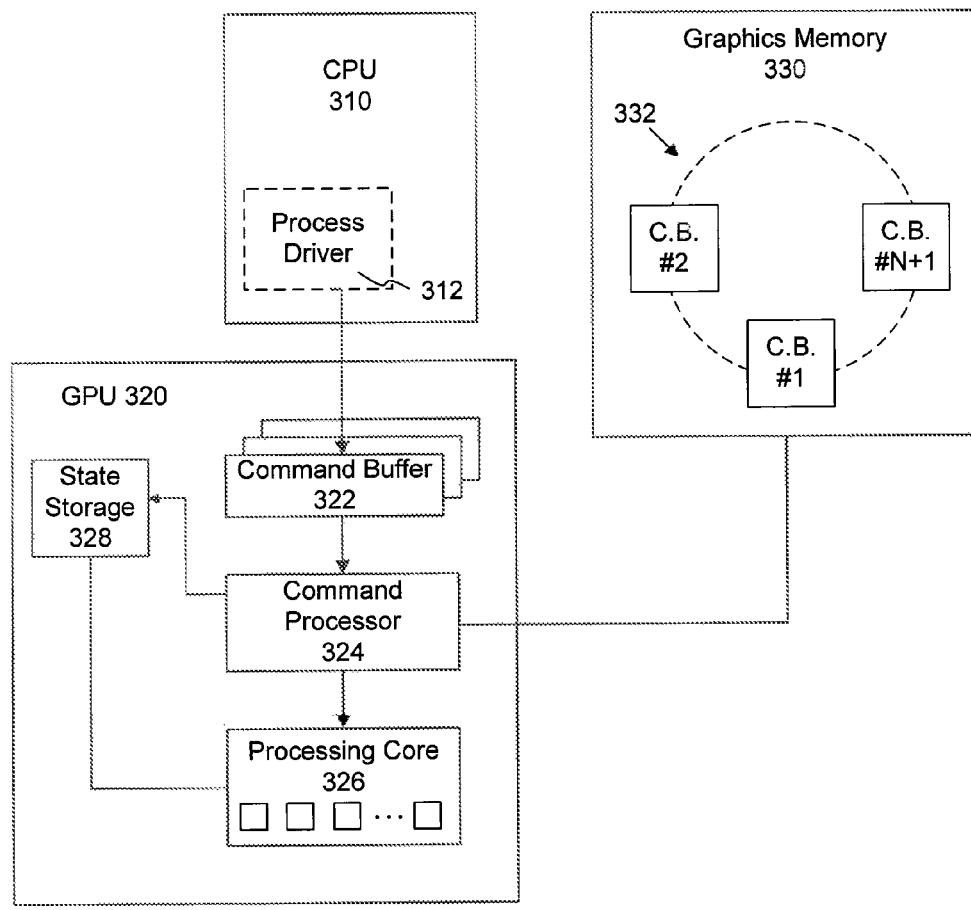
FIG. 3 is an illustrative block diagram of a processing system, according to an embodiment of the present invention.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

FIG. 1 is a block diagram illustration of a conventional processing system 100. Processing system 100 includes a CPU 110 and a GPU 120. GPU 120 includes command buffers 122, a command processor 124, a processing core 126, and a state storage 128.

CPU 110 can have a number of applications running thereon. One or more of these applications can generate and send commands (e.g., draw commands) to GPU 120 for execution. Draw commands often include the same operation executed on a number of different sets of data. For example, draw commands can include changes to the state of the pixels of a display. Because GPU 120 is a highly parallelized device, GPU 120 can be especially well-suited to handle these types of commands.

To facilitate interaction between CPU 110 and GPU 120, CPU 110 includes a number of process drivers 112. In an embodiment, a process driver is provided for each process running on CPU 110 that sends commands to GPU 120. FIG. 1 shows a single process driver 112 for simplicity. However, one skilled in the art would appreciate that multiple process drivers, each for a different application running on CPU 110. Based on the needs of its corresponding application, process driver 112 can create command buffers 122. For example, each of the command buffers can include a number of commands that specify the relevant state values (e.g., the values of one or more constants, depth, a texture, etc.) and command(s) to be executed on the processing core using that state information (e.g., a draw command).

Command processor 124 retrieves commands from command buffers 122. For the commands relating to setting state information, command processor sets the relevant values in state storage 128. FIG. 2 shows a schematic diagram of conventional state storage 128 implemented, for example, according to DirectX 9. As shown in FIG. 2, state storage 128 includes N contexts 202*a-n* (collectively "contexts 202"). Contexts 202 include a respective one of constants 204*a-n* (collectively "constants 204"). When command processor 124 retrieves a command from command buffer 122, it can update portions of one of the contexts 202 that is not currently being used by a command currently in flight. Thereafter, when that command is put into flight, it can operate using the state information stored in its respective context 202. In particular, constants 204 remain constant in a command's respective context throughout the operation of the command on processor core 126.

As far as command(s) of the command buffer that are to be executed by processing core 126, command processor 124 delivers those commands to processing core 126, where they will be executed using a respective one of contexts 202. In an embodiment, command processor 124 can be a microprocessor or microcontroller. Command processor 124 configurable for selecting command buffers 122 based on inputs received from a run list controller (RLC) (not shown). The RLC can be controlled by an operating system running on CPU 110.

Processing core 126 is a highly parallelized processing device that is especially suited to execute drawing commands in which the same operation is conducted on a number of different sets of data. For example, as shown in FIG. 1, processing core 126 can include a multitude of individual execution modules 127.

As noted above, state storage 128 (including constants 204) is implemented in hardware. Maintaining constant values in hardware, however, is expensive in terms of silicon board space. Thus, many systems have eliminated the use of state storage 128 to store constants (e.g., systems that implement DirectX 10). Instead, newer applications running on CPU 110 are configured to use memory (not shown in FIG. 1) to store constants needed during execution. Although these systems may overcome the drawbacks of hardware-based constant storage, they may be unable to efficiently execute certain programs configured to use these hardware-based constants.

In embodiments described herein, a ring of constant buffers is provided for storing constants associated with commands running on a processing core. As explained in greater detail below, the ring of constant buffers is sized so that when updates are made, none of the constant buffers currently in use by commands running on the processing core are affected. In this manner, even newer processing systems that eliminate expensive hardware-based constant storage can maintain backwards compatibility with older legacy programs that still access hardware-based stored constants.

FIG. 3 is a block diagram illustration of a processing system 300, according to an embodiment of the present invention. The processing system 300 includes a CPU 310, a GPU 320, and a graphics memory 330. CPU 310 includes a process driver 312 running thereon. Process driver 312 corresponds to an application running on CPU 310. GPU 320 includes command buffers 322, a command processor 324, a processing core 326, and a state storage 328.

Graphics memory 330 includes a ring of constant buffers 332. Ring of constant buffers 332 can be initialized by command processor 324. Ring of constant buffers 232 includes N+1 constant buffers, where the value N represents the maximum possible number of contexts that state storage 328 can store simultaneously. In an embodiment, N is eight. As would be apparent to those skilled in the relevant arts based on the description herein, the value of N can take on any number of different values without departing from the scope and spirit of the present invention. Although FIG. 3 shows CPU 310, GPU 320, and graphics memory 330 implemented separately, those skilled in the art will recognize that these components can be integrated together on a single die. The operation of system 300 will be described in greater detail with reference to FIG. 4.

Figure 4:
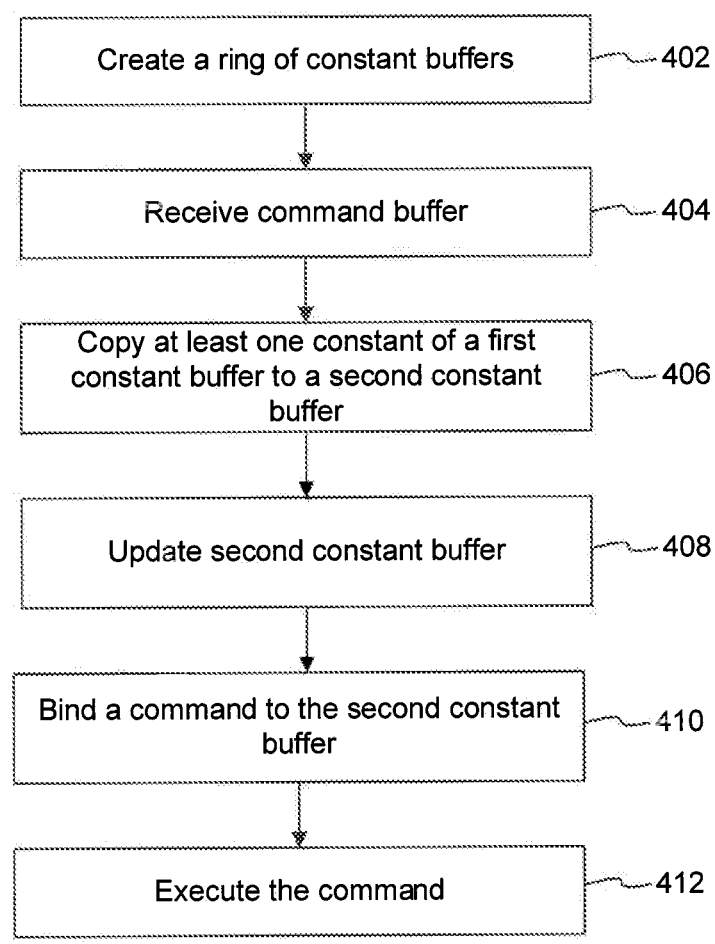
FIG. 4 is a flowchart illustrating a method for providing constants, according to an embodiment of the present invention.

FIG. 4 is a flowchart 400 of an exemplary method of practicing an embodiment of the present invention. More specifically, the flowchart 400 includes example steps for providing constant values, according to an embodiment of the present invention. Other structural and operational embodiments will be apparent to persons skilled in the relevant art(s) based on the following discussion. The steps shown in FIG. 4 are not necessarily required to occur in the order shown. The steps of FIG. 4 are described in detail below.

In step 402, a ring of constant buffers is created. For example, in FIG. 3 command processor 324 can create ring 332 in graphics memory 330. As shown in FIG. 3, ring 332 includes N+1 constant buffers, where N is the number of contexts that state storage 328 can store simultaneously. Including at least N+1 constant buffers in ring 332 ensures that a constant buffer can be overwritten with new values without affecting any commands that are in the graphics pipeline because there can be, at most, N different commands having different state being executed on GPU 320 at a single time.

In step 404, a command buffer is received. For example, in FIG. 3, process driver 312 can generate one or more of command buffers 322 in response to input from its corresponding application running on CPU 310. For example, the application can be game running on CPU 310 and the command buffer can include a command to draw an image in response to an input from a user.

In step 406, at least one constant of a first constant buffer is copied to a second constant buffer. For example, in FIG. 3, command processor 324 can select one of command buffers 322. In addition to including commands to be executed by processing core 326, the command buffer can also include commands that specify the state to be used in executing those commands. However, in contrast to the command buffers includes in conventional system shown in FIG. 2, command buffers 322 include a command to copy the contents of the most recently updated constant buffer to a constant buffer not currently in use (e.g., the constant buffer located N buffers away in the clockwise direction in FIG. 3).

In an embodiment, command processor 324 can copy all the constants included in the first constant buffer to the second constant buffer. Because the drawing command may rely on constants that have not been updated as well as constants that have been updated, all constants that will be needed for operation are ensured of being included in the second constant buffer.

In another embodiment, command processor 324 can be configured to establish a "high water mark" prior to executing the copy. For example, command process 324 can track the number of constants that a process uses. If command processor 324 determines that the process does not use constants beyond a certain point in a command buffer, termed a "high water mark," command processor 324 may only copy constants up to that high water mark.

Figure 5:
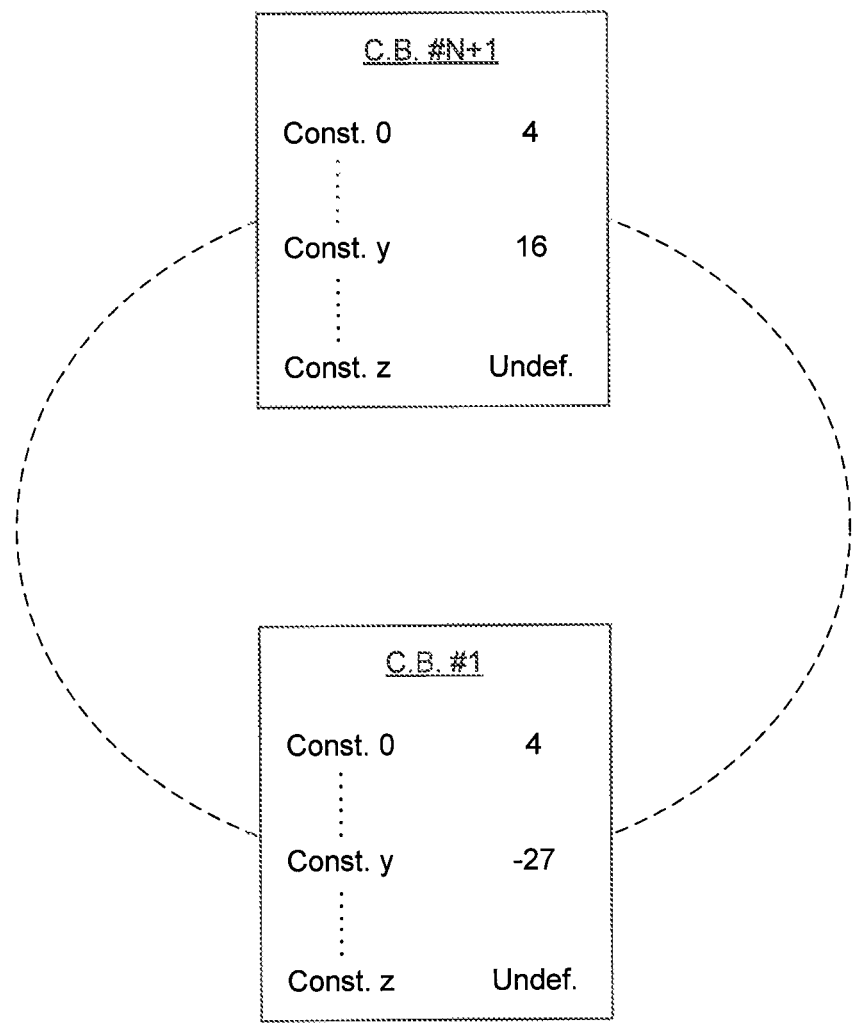
FIG. 5 is an illustrative block diagram of a ring buffer, according to an embodiment of the present invention.

For example, FIG. 5 is an exemplary illustration of a ring of constant buffers 500, according to an embodiment of the present invention. In accordance with the embodiment of FIG. 5, command processor 324 determines that the application only uses constants between constant 0 and constant y, leaving the others undefined. Thus, when executing the copy, instead of copying all the values of constant buffer 1 to constant buffer N+1, command processor 324 can instead only copy constants between constant 0 and constant y, thereby saving processing time.

In another embodiment, command processor 324 can establish a "dynamic high water mark." In establishing the dynamic high water mark, command processor 324 can identify values for the same constant for all constant buffers within the ring. If all the constant buffers have the same value for a particular constant, command processor 324 can omit copying that constant. For example, in FIG. 5, command processor 324 can omit copying constant 0 if the value of constant 0 is the same for all of the constant buffers in ring 500. Like the high water mark described above, the establishing of a dynamic high water mark reduces the number of values that must be copied, thereby reducing processing time and enhancing overall performance.

In step 408, the second constant buffer is updated. For example, in FIG. 3, command processor 324 can update the second constant buffer based a command included in the command buffer. For example, the command buffer can include a command to update a particular value of the second constant buffer. For example, the application to which process driver 312 corresponds can generate a constant to be used by the command when executing and command processor can overwrite a constant in the second constant buffer to that value.

In step 410, the command is bound to the second constant buffer. For example, in FIG. 2, command processor 324, responsive to another command in the command buffer, can bind the held command to be executed on processing core 326 to the second command buffer.

In step 412, the command is executed. For example, in FIG. 3, the processing core 226 can execute the draw command. In executing the draw command, the command, which has been binded to command buffer N+1, processing core 226 can access command buffer N+1 when constants are needed during execution of the command.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method of providing constants in a processing device, comprising:
   creating a ring of constant buffers in a memory coupled to the processing device;
   responsive to a received command:
      copying a constant of a first constant buffer of the ring to a constant of a second constant buffer of the ring, wherein the second constant buffer is not currently in use by any command currently executing on the processing device;
      updating the constant in the second buffer; and
      binding the received command to the second constant buffer;
   wherein a size of the ring of constant buffers is at least N+1, N being a number of contexts that a state storage of the processing device can simultaneously store and wherein the second constant buffer is located at least N constant buffers away from the first constant buffer in the ring.

2. The method of claim 1, further comprising:
   executing the received command using the processing, device.

3. The method of claim 2, wherein executing comprises:
   accessing the constant of the second constant buffer.

4. The method of claim 1, wherein creating comprises creating the ring of constant buffers in a graphics memory.

5. The method of claim 1, further comprising:
   identifying a maximum number of constants previously accessed by commands of a command buffer.

6. The method of claim 5, wherein copying comprises:
   copying a plurality of constants of the first constant buffer to the second constant buffer, wherein the constant of the first constant buffer is included in the plurality of constants and wherein the number of constants in the plurality of constants is equal to the maximum number.

7. The method of claim 1, wherein copying comprises:
   copying a plurality of constants of the first constant buffer to the second constant buffer, wherein the constant of the first constant buffer is included in the plurality of constants and wherein constants of the plurality of constants have values different from respective constants of the second constant buffer.

8. The method of claim 1, further comprising:
   holding the received command in a command buffer.

9. The method of claim 1, wherein the received command is a first received command, wherein the copying is executed responsive to a second received command, and wherein the first and second received command are included in a same command buffer.

10. A processing device, comprising:
    a memory configured to store a ring of constant buffers;
    a command processor configured to, responsive to a received command:
       copy a constant of a first constant buffer of the ring to a constant of a second constant buffer of the ring, wherein the second constant buffer is not currently in use by any command currently executing on the processing device;
       update the constant in the second buffer; and
       bind the received command to the second constant buffer;
    wherein a size of the ring of constant buffers is at least N+1, N being a number of contexts that a state storage of the processing device can simultaneously store and wherein the second constant buffer is located at least N constant buffers away from the first constant buffer in the ring.

11. The processing device of claim 10, further comprising:
a processing core configured to execute the received command.

12. The processing device of claim 11, wherein the processing core is configured to access the constant of the second constant buffer.

13. The processing device of claim 10, wherein the command processor is configured to identify a maximum number of constants previously accessed by commands of a command buffer.

14. The processing device of claim 13, wherein the command processor is configured to copy a plurality of constants of the first constant buffer to the second constant buffer, wherein the constant of the first constant buffer is included in the plurality of constants, and wherein the number of constants in the plurality of constants is equal to the maximum number.

15. The processing device of claim 10, wherein the command processor is configured to copy a plurality of constants of the first constant buffer to the second constant buffer, wherein the constant is included in the plurality of constants and wherein constants of the plurality of constants have values different from respective constants of the second constant buffer.

16. The processing device of claim 10, wherein the received command is included in a command buffer.

17. The processing device of claim 10, wherein the received command is a first received command, wherein the command processor is configured to copy the constant responsive to a second received command, and wherein the first and second received commands are included in a same command buffer.

* * * * *